(12) United States Patent
Smits

(10) Patent No.: US 7,706,638 B1
(45) Date of Patent: Apr. 27, 2010

(54) SYSTEM, APPARATUS AND METHOD FOR COLOR MACHINE VISION WITH BLACK AND WHITE PHOTOELECTRIC SENSOR

(75) Inventor: Gerard D. Smits, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1673 days.

(21) Appl. No.: 10/832,199

(22) Filed: Apr. 26, 2004

(51) Int. Cl.
*H04N 1/46* (2006.01)
*G03F 3/10* (2006.01)
*G06K 7/00* (2006.01)

(52) U.S. Cl. .................. 382/312; 358/509; 358/512; 358/514; 358/527; 358/500

(58) Field of Classification Search ............. 382/312; 348/210.99, 231.2, 294, 296; 250/341.8, 250/363.02, 365, 368, 559.06; 358/500, 358/509, 510, 512, 513, 514, 527, 474, 475, 358/479, 480, 482, 483
See application file for complete search history.

(56) References Cited

U.S. PATENT DOCUMENTS

| | | | |
|---|---|---|---|
| 4,806,776 A * | 2/1989 | Kley | ............. 250/559.24 |
| 5,204,737 A * | 4/1993 | Hakkaku et al. | ............. 358/500 |
| 6,323,942 B1 | 11/2001 | Bamji | |
| 6,512,838 B1 | 1/2003 | Rafii et al. | |
| 6,515,740 B2 | 2/2003 | Bamji et al. | |
| 6,522,395 B1 | 2/2003 | Bamji et al. | |
| 6,580,496 B2 | 6/2003 | Bamji et al. | |
| 6,614,422 B1 | 9/2003 | Rafii et al. | |
| 6,710,806 B1 * | 3/2004 | Satoh | ............. 348/350 |
| 2002/0057469 A1 * | 5/2002 | Yushiya et al. | ............. 358/509 |
| 2002/0089599 A1 * | 7/2002 | Menning | ............. 348/370 |
| 2002/0106109 A1 * | 8/2002 | Retterath et al. | ............. 382/104 |
| 2005/0078886 A1 * | 4/2005 | Yushiya et al. | ............. 382/312 |

FOREIGN PATENT DOCUMENTS

EP          1098190 A2 *   5/2001

* cited by examiner

*Primary Examiner*—Jerome Grant, II

(57) ABSTRACT

A color machine vision system with two or more differently colored light sources and one black and white photoelectric sensor (BW sensor). The light sources are employed to separately illuminate a target object with a different color, e.g., red, green, blue, magenta, yellow, and cyan. The BW sensor senses the reflection of colored light off the target object from each light source. A separate measurement is generated by the BW sensor for the reflected colored light from each light source and stored for further processing to render a color image of the target object. A calibration is performed to enable the BW sensor to sense reflected colored light from the target object in a linear mode, not the non-linear (saturated) mode. Since calibration enables the BW sensor's electronic components to operate (sense reflected primary colored light) in a relatively linear mode, the sensor is relatively accurate and fast in alternatively sensing/measuring reflected primary colored light from each of the light sources.

38 Claims, 8 Drawing Sheets

SYSTEM, APPARATUS AND METHOD FOR COLOR MACHINE VISION WITH BLACK AND WHITE PHOTOELECTRIC SENSOR

FIELD OF THE INVENTION

The present invention is related to the field of machine vision, and more particularly to enabling one black and white photoelectric sensor and multiple differently colored light sources to provide color machine vision.

BACKGROUND OF THE INVENTION

Machine vision has become pervasive in many different applications, including industrial processes, manufacturing and consumer electronics. Black and White machine vision systems, which can only generate black and white images of a target object tend to be relatively simple and inexpensive. In contrast, Color machine vision is typically provided by relatively complex and expensive systems. Due in part to their relative simplicity and low cost, Black and White machine vision systems are well suited for many applications. However, there are many other applications where Color machine vision systems are preferable and often necessary. Unfortunately, the relatively high cost and complexity of Color machine vision systems has prevented their wide spread adoption.

BRIEF DESCRIPTION OF THE DRAWINGS

The invention will become more readily apparent from the following Detailed Description, which proceeds with reference to the accompanying drawings, in which.

DETAILED DESCRIPTION

Figure 1:
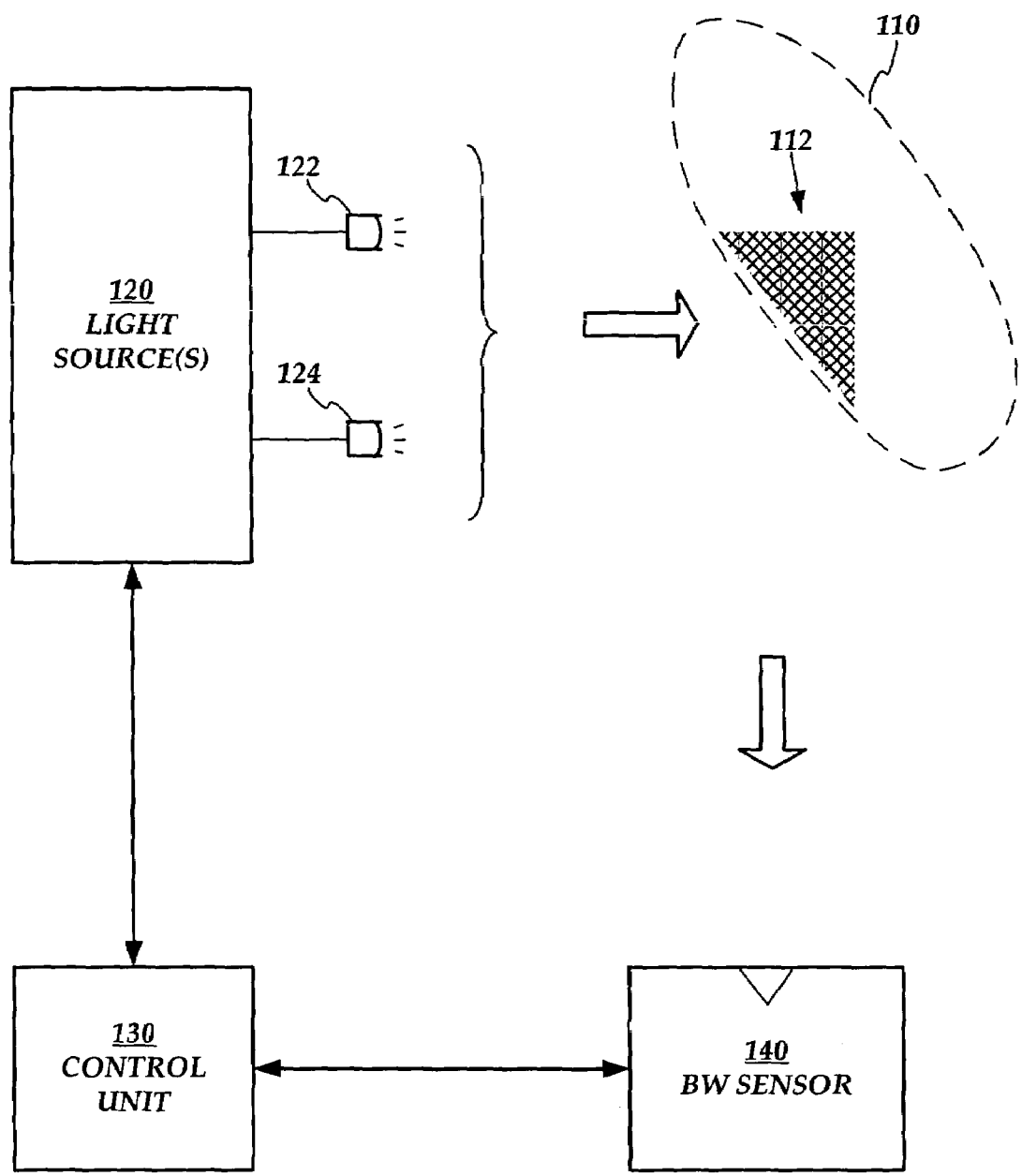
FIG. 1 illustrates one embodiment of a color machine vision system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. The meaning of "in" includes "in" and "on." The term "coupled" means a direct connection between the items that are connected, or an indirect connection through one or more intermediary devices or components.

The term "black and white sensor" and "BW sensor" refers to a device that is configured to sense light that is incident upon it's surface. The device enables the incident light to be measured with a monochromatic scale, such as a grey scale. In contrast, a color sensor typically includes at least three sensors for separately sensing each primary color included in the incident light. The device includes at least one component that has a linear range of operation and a non-linear range of operation. The device may include at least one of a photoelectric diode, capacitive coupled diode (CCD) element, photo-resistive element, and the like. The components of the BW sensor can be semiconductor transistors based on at least one of a CMOS process, a GAS process, a BJT process, and the like.

Briefly, the present invention enables color machine vision with separate differently color light sources and one black and white photoelectric sensor (BW sensor). In one embodiment, two light sources are employed to separately illuminate a target object with differently colored light, e.g., any two of red, green, and blue, or magenta, yellow, and cyan. The BW sensor senses/measures the reflection of colored light off a surface of the target object from each light source. A separate measurement is generated by the BW sensor for the reflected colored light from each light source and stored for further processing to present/render a color image of the target object. A calibration is performed to enable the BW sensor to sense/measure the colored light reflected from the target object in a linear mode, not the non-linear (saturated) mode. Since calibration enables the BW sensor's electronic components to operate (sense/measure reflected primary colored light) in a relatively linear mode, the sensor is relatively accurate and fast in alternatively sensing/measuring reflected colored light from each of the light sources.

In one embodiment, the operation of the BW sensor is initially calibrated for a target object based on the amount of reflected colored light that is sensed by the sensor for relatively brief periods of time for each light source. Based on the amount of reflected colored light that is sensed/measured, separate periods of time are determined for the BW sensor to sense reflected light from the target object for each light source. In this way, the BW sensor is prevented from sensing reflected light for so long that the sensor's electronic components saturate and begin sensing reflected light in a non-linear mode. In another embodiment, the calibration of the BW sensor is performed if non-linear operation of the sensor is detected.

In one embodiment, each colored light from each light source could be switched on and then off (burst mode) to separately illuminate the target object with its particular color for its determined period of time. In another embodiment, a shutter, e.g., fixed mechanical shutter and/or electronic shutter, could be used to control the determined period of time that colored light from the light source can illuminate the target object and subsequently be sensed/measured by the BW sensor. In yet another embodiment, a shutter could be used to control the determined period of time that reflected colored light from the light source can be sensed/measured by the BW sensor.

In another embodiment, the target object may be illuminated by a particular colored light for one light source more often than at least one of the other light sources. The increased frequency of illumination by one particular colored light from one light source could enable the BW sensor to measure additional detail associated with that particular color. For example, if the color machine vision system was employed in a medical application, detail associated with the primary color of red could be emphasized by increasing the frequency that the primary (red) color light source illuminates a target object in comparison to the other primary color light sources.

In another embodiment, the particular colored light from each light source can be selected to enhance details on the surface of a target object that has a particular coloring. In another embodiment, the colored light emitted by a light source may be filtered with another color and/or polarized. In yet another embodiment, the light source may include a light emitting diode (LED), incandescent light source, high intensity discharge light source, fluorescent light source, phosphorescent light source, and the like.

System Overview

FIG. 1 illustrates a block diagram of an overview of a color machine vision system 100 that includes single BW sensor 140, power supply 120 and monochromatic light sources 122 and 124 that project light onto target object 110 in one of two different colors (light with different wavelengths) such as red, green, blue, yellow, magenta and cyan.

In still another embodiment, at least one of light sources 122 and 124 could be configured to include a lens, filter, reflector, projector, and the like. In another embodiment, at least one of light sources 122 and 124 could be configured to include a light emitting diode (LED), incandescent light source, high intensity discharge light source, fluorescent light source, phosphorescent light source, and the like.

In yet another embodiment, at least one of the light sources may illuminate the target object with other than colored light, e.g., ultraviolet light, infrared light, and the like. In another embodiment, three or more light sources may be employed to illuminate the target object.

In FIG. 1, Black and White (BW) sensor 140 is arranged so that colored light that is projected from light sources 122 and 124 onto surface 112 can be reflected onto a photo-sensitive portion of the sensor. In one embodiment, BW sensor 140 includes at least one of a photoelectric diode, capacitive coupled diode (CCD) element, photo-resistive element, and the like. The components of the BW sensor can be semiconductor transistors based on at least one of a CMOS process, a GAS process, a BJT process, and the like.

In FIG. 1, controller 130 is arranged to control the operation of power supply 120, light sources 122 and 124, and BW sensor 140. Controller 130 can also calibrate the amount of time that the BW sensor can measure colored light without entering a non-linear mode of operation. In operation, controller 130 manages the period of time that BW sensor 140 can measure reflected colored light from surface 112 so that the reflected light is typically measured in a linear mode instead of the non-linear mode. By operating in the BW sensor's linear mode, the accuracy of the measured light is improved and the speed is increased for enabling the sensor to switch to measuring another colored light.

Controller 130 can also determine the frequency and duration of each differently colored light that is projected onto surface 112 and subsequently reflected onto BW sensor 140. For some applications, it may be preferable to increase the frequency (in comparison to the other colored lights) at which one colored light is projected onto the surface of a target object and subsequently reflected onto the BW sensor. In this way, more detailed information is obtained for a particular color of interest, e.g., the color red in medical applications.

In one embodiment, if it is determined that the measured amount of reflected light for a particular color is relatively low in comparison to the other colors, controller 130 may separately increase the period for measuring that color for BW sensor 140. In another embodiment, controller 130 can include a datastore for storing measurements of each of the reflected colored lights.

In yet another embodiment, controller 130 may render a color image of the surface of the target object based on the measurements of the reflected colored light. Although not shown, the rendered colored image can be presented for viewing on a display that can be disposed local and/or remote to the color machine vision system.

Figure 2:
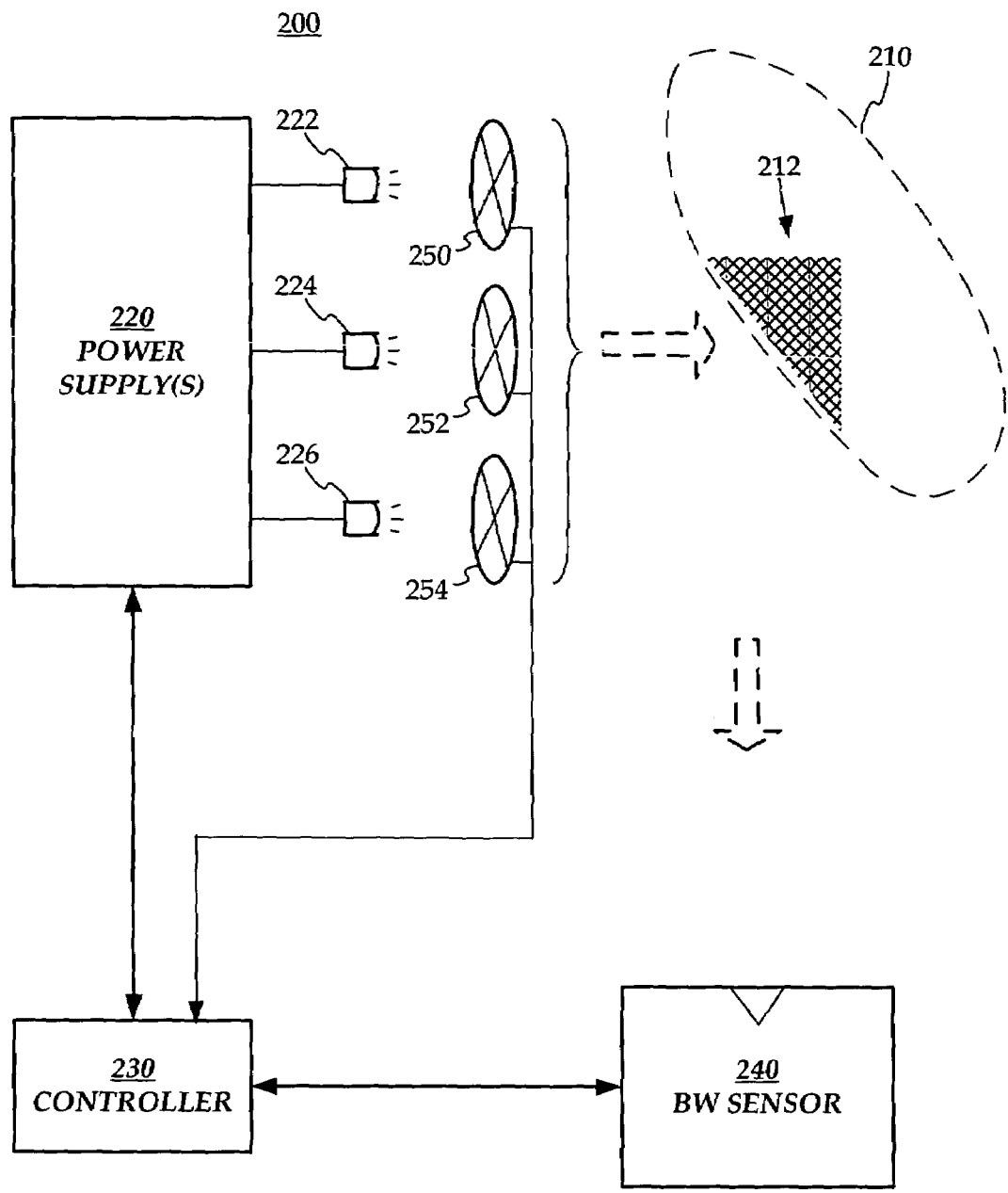
FIG. 2 show another embodiment of a color machine vision system.

FIG. 2 illustrates a block diagram of an overview of a color machine vision system 200 that includes single BW sensor 240 and three different light sources (monochromatic light emitters) that project light onto target object 210 in one of three different colors, and which is substantially similar in some ways to system 100 shown in FIG. 1, albeit different in other ways. As shown, power supply 220 is coupled to three emitters 222, 224 and 226. Each emitter may be arranged to project one of the three different colored lights onto surface 212 of target object 210. Surface 212 is positioned so that colored light reflects from the surface onto a photo-sensitive portion of BW sensor 240.

Additionally, three separate shutters 250, 252, and 254 are arranged between colored lights projected by respective emitters, 222, 224, and 226 and surface 212. The opening and closing of each separate shutter can control the amount of time that a particular colored light can be projected onto surface 212 and subsequently reflected onto BW sensor 240. In one embodiment, each shutter (250, 252, and 254) includes at least one filter for changing the wavelength and/or polarization of light projected by each emitter onto target object 210.

Also, controller 230 can be arranged to operate in a manner substantially similar to controller 130 such as managing the operation of BW sensor 240, power supply 220, emitters 222, 224, and 226, and shutters 250, 252, and 254.

Figure 3:
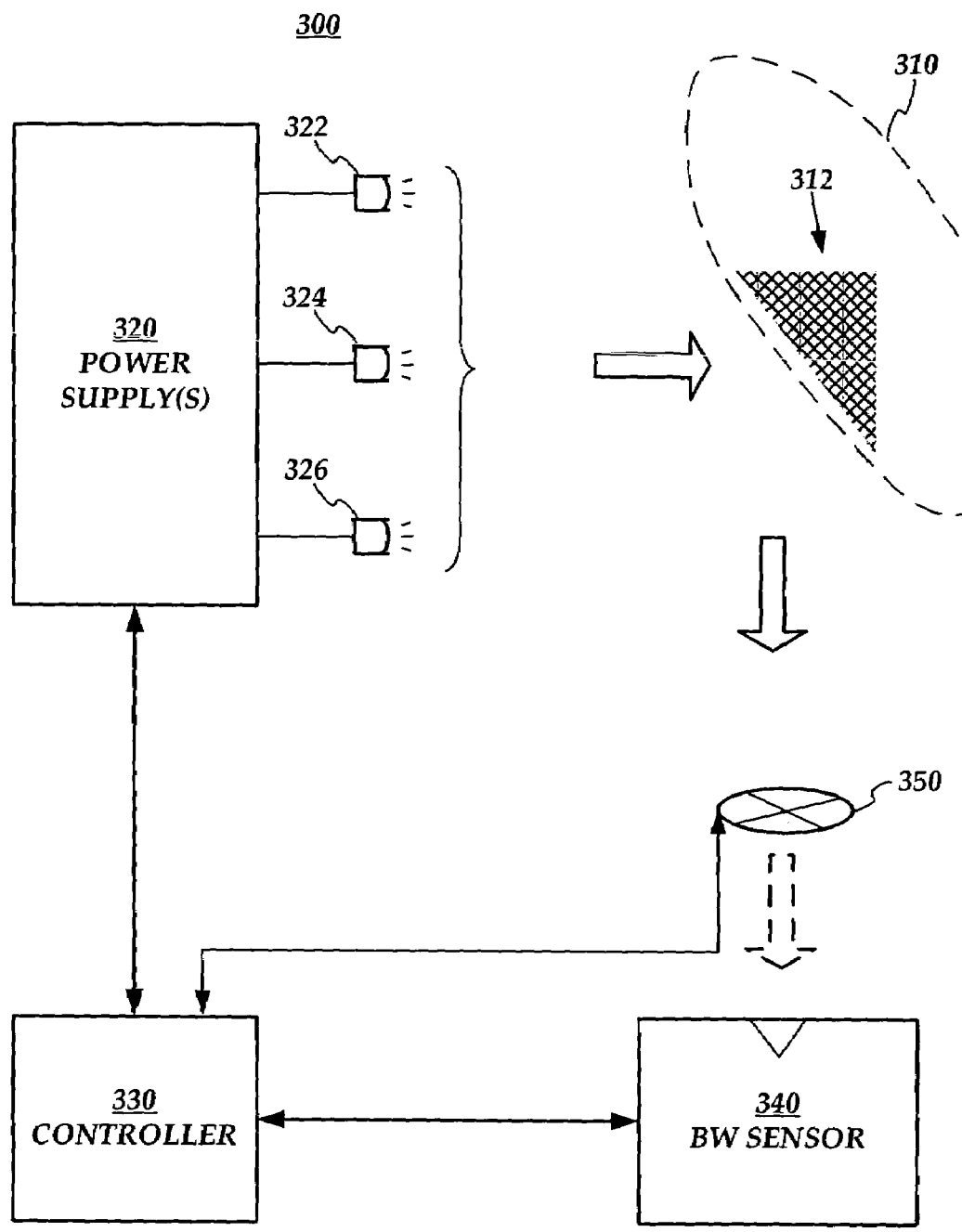
FIG. 3 illustrates yet another embodiment of a color machine vision system.

FIG. 3 illustrates an overview of a color machine vision system 300 that includes single BW sensor 340 and three different light sources (monochromatic light emitters) that project light onto 310 target object in one of three different colors, and which is substantially similar to system 100 shown in FIG. 1, albeit different in some ways. As shown, power supply 320 is coupled to three emitters 322, 324 and 326. Each emitter may be arranged to project one of the three different colors onto surface 312 of target object 310. Surface 312 is positioned so that colored light reflects from the surface onto a photo-sensitive portion of BW sensor 340.

Additionally, shutter 350 is arranged between surface 312 and BW sensor 340. The opening and closing of shutter 350 can control the amount of time that a particular colored light can be reflected from surface 312 onto BW sensor 340. In one embodiment, shutter 350 includes at least one filter for changing the wavelength and/or polarization of light reflected from surface 312 onto BW sensor 340.

Also, controller 330 can be arranged to operate in a manner substantially similar to controller 130 such as managing the operation of BW sensor 340, power supply 320, emitters 322, 324, and 326, and shutter 350.

Figure 4:
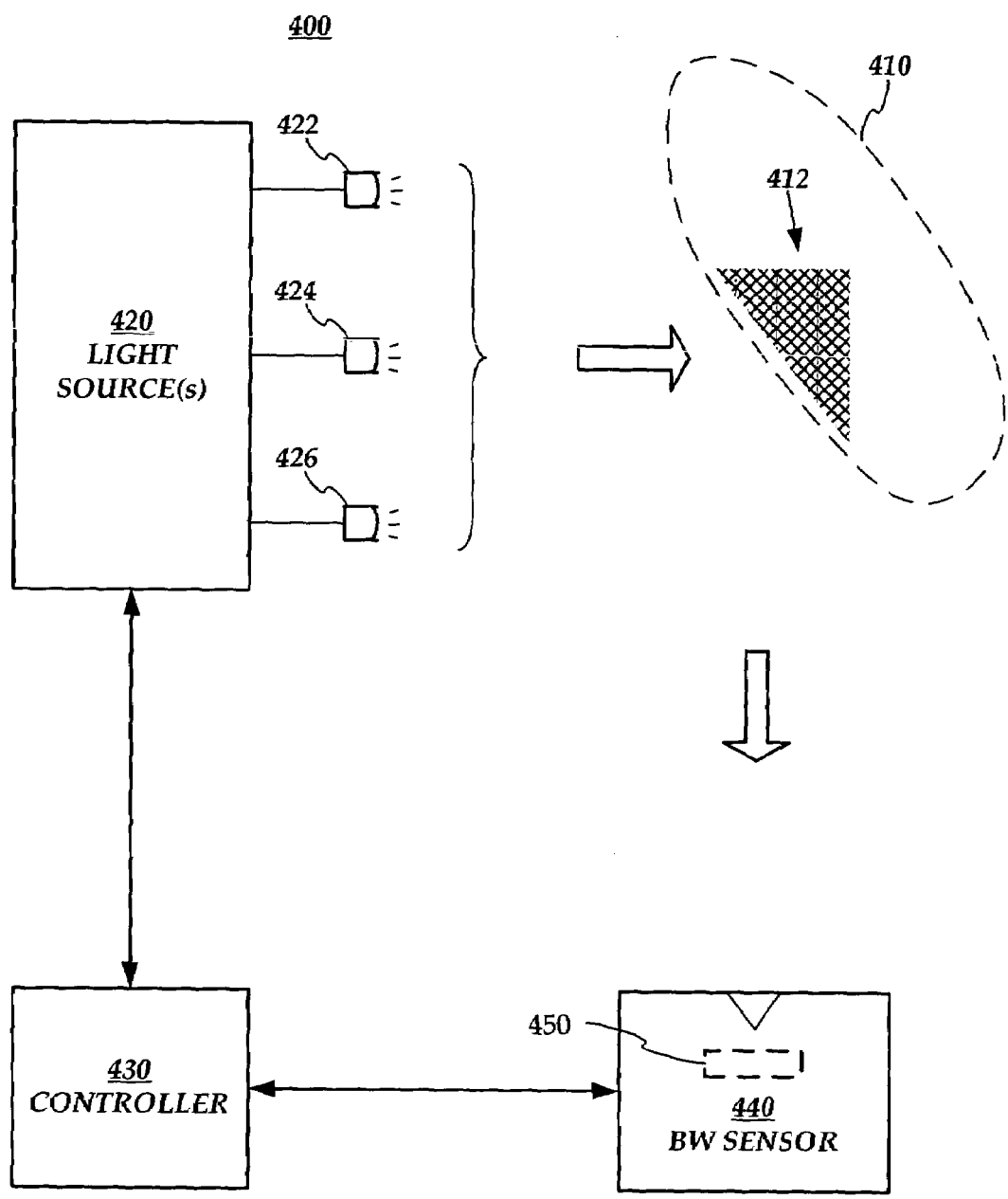
FIG. 4 shows still another embodiment of a color machine vision system.

FIG. 4 illustrates an overview of a color machine vision system 400 that includes single BW sensor 440 and three different light sources that project light onto 410 target object in one of three different colors, and which is substantially similar to system 100 shown in FIG. 1 in some ways, albeit different in other ways. As shown, light source 420 is coupled to three monochromatic light emitters 422, 424 and 426. Each emitter may be arranged to project one of the three different colors onto surface 412 of target object 410. Surface 412 is positioned so that colored light reflects from the surface onto a photo-sensitive portion of BW sensor 440.

Additionally, electronic shutter 450 is arranged in BW sensor 440 to control the period of time that colored light is measured by the sensor. Controller 430 can activate and de-activate shutter 450 to control when BW sensor 440 may measure a particular colored light that is reflected from surface 412. Also, controller 430 can be arranged to operate in a manner substantially similar to controller 130 such as managing the operation of light source 420, and emitters 422, 424, and 426.

As shown, light source 420 is coupled to emitters 422, 424 and 426. In one embodiment, light source 420 may include a single source of light, such as white light, that is separately coupled to each of the emitters 422, 424 and 426. Each emitter may be arranged to change the white light into one of the different colors and project the colored light onto surface 412 of target object 410.

In another embodiment, light source 420 may include three colored light sources.

Each colored source of light would be coupled to one of the emitters 422, 424 and 426 for illuminating surface 412 with different colored lights.

In yet another embodiment, light source 420 would supply energy to each of the emitters 422, 424 and 426 for separately generating colored light onto surface 412.

Graphs

Figure 5A:
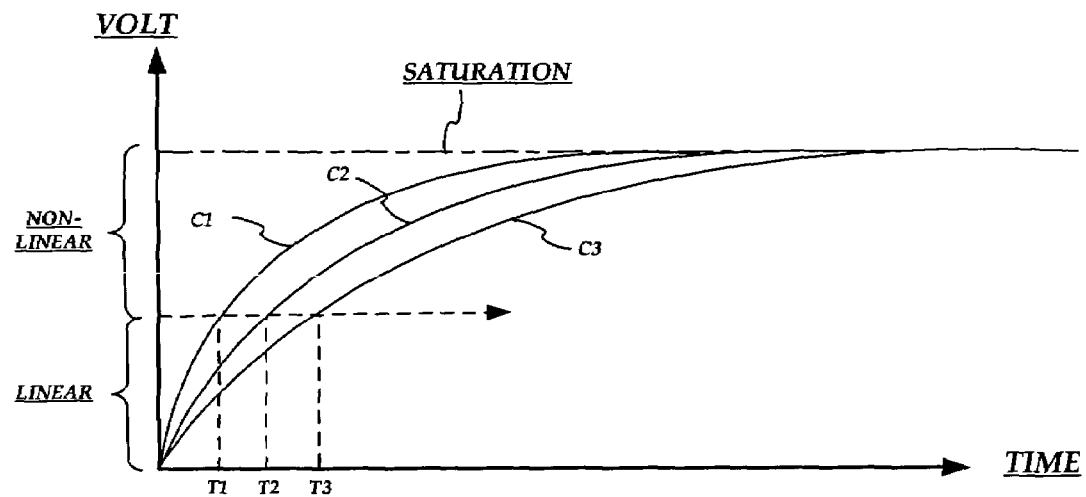
FIG. 5A illustrates a graph plotting voltage versus time for three measurements of differently colored light from three different light sources that has been reflected off a target object with a coloring that includes more of one of the primary colors than either of the other two primary colors.

FIG. 5A illustrates a graph plotting voltage versus time for three measurements of differently colored light from three different light sources (C1, C2, and C3) that has been reflected off a target object with a coloring that includes more of one of the colors (C1) than either of the two other colors (C2 and C3). As shown, the period of time (T1) for linearly measuring the reflected light off the target object for one of the colored sources (C1) is substantially shorter than the periods of time (T2 and T2) for the two other colored sources (C2 and C3), respectively.

Figure 5B:
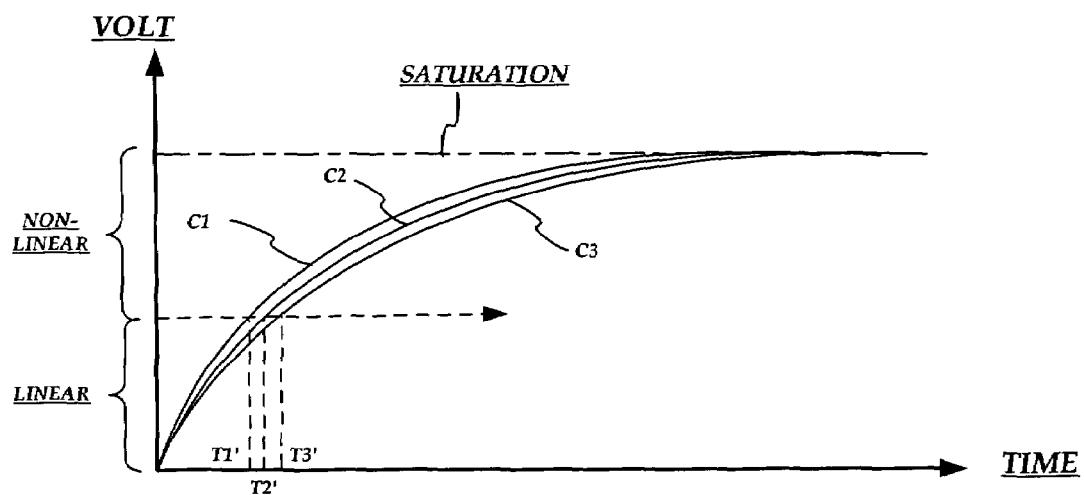
FIG. 5B shows a graph plotting voltage versus time for three measurements of primary colored light from three different light sources that has been reflected off a target object with a coloring that is substantially balanced between the three primary colors.

FIG. 5B illustrates a graph plotting voltage versus time for three measurements of colored light (C1, C2, and C3) from three different light sources that has been reflected off a target object with a coloring that is substantially balanced between the three colors. As shown, the periods of time (T1, T2 and T3) are substantially similar for linearly measuring the reflected light from each of the respective colored sources (C1, C2 and C3).

Figure 6A:
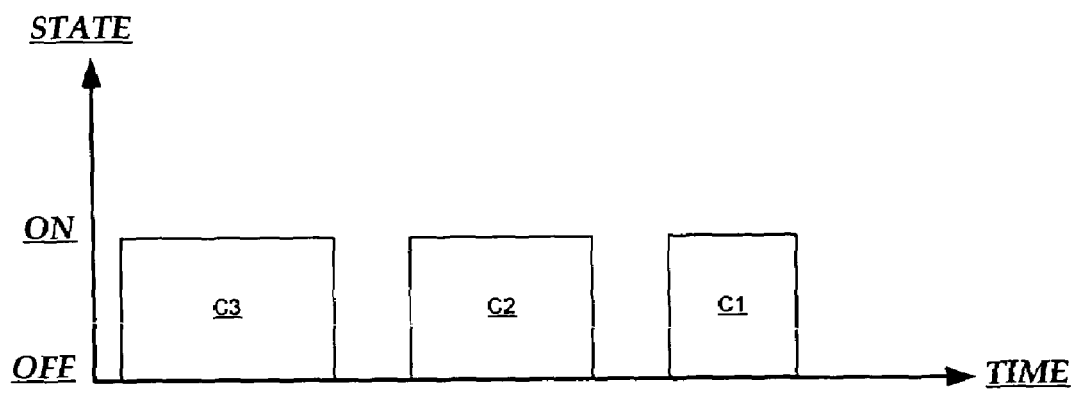
FIG. 6A illustrates a graph plotting the time periods for the on state of a BW sensor measuring reflected light from three different light sources over time.

FIG. 6A illustrates a graph plotting the time periods for the on state of a BW sensor measuring reflected light from three different light sources (C1, C2, and C3) over time. The light from the three different colored sources (C1, C2, and C3) has been reflected off a target object (not shown) with a coloring that includes more of one of the colors (C1) and less of another color (C3) than either of the two other colors. (See discussion above for FIG. 5A) As shown, the longest time period for an on state of the BW sensor occurs for the color (C3) which is least represented on the surface of the target object. In comparison, the shortest time period for an on state for the BW sensor occurs for the color (C1) which is most represented on the surface of the target object.

As illustrated in FIG. 6A, the invention enables the BW sensor to operate in its linear mode for measuring reflected light from three differently colored light sources by varying the time period associated each colored light source.

Figure 6B:
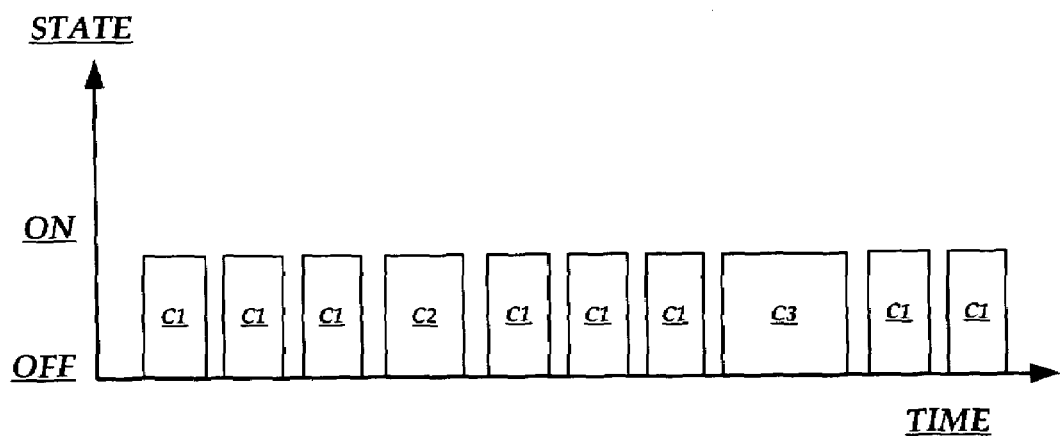
FIG. 6B shows a graph plotting the time periods for the on state of a BW sensor measuring reflected light from three different light sources over time.

FIG. 6B illustrates a graph plotting the time periods for the on state of a BW sensor measuring reflected light from three different light sources (C1, C2, and C3) over time. The light from the three different colored sources (C1, C2, and C3) has been reflected off a target object with a coloring that includes more of one of the colors (C1) and less of another color (C3) than either of the two other colors. (See FIG. 5A)

In FIG. 6B, the longest time period for an on state of the BW sensor occurs for the color (C3) which is least represented on the surface of the target object (not shown). Also, the shortest time period for an on state of the BW sensor occurs for the color (C1) which is most represented on the surface of the target object.

FIG. 6B shows how more time periods can be added for measuring reflected light from one or more of the colored light sources, e.g., adding more time periods for measuring reflected light from colored source C1 whose color is most represented on the surface of the target object. In this way, additional measuring can occur for a particular colored light that is more relevant to a particular application, such as the color red for medical applications.

Flowcharts

Figure 7:
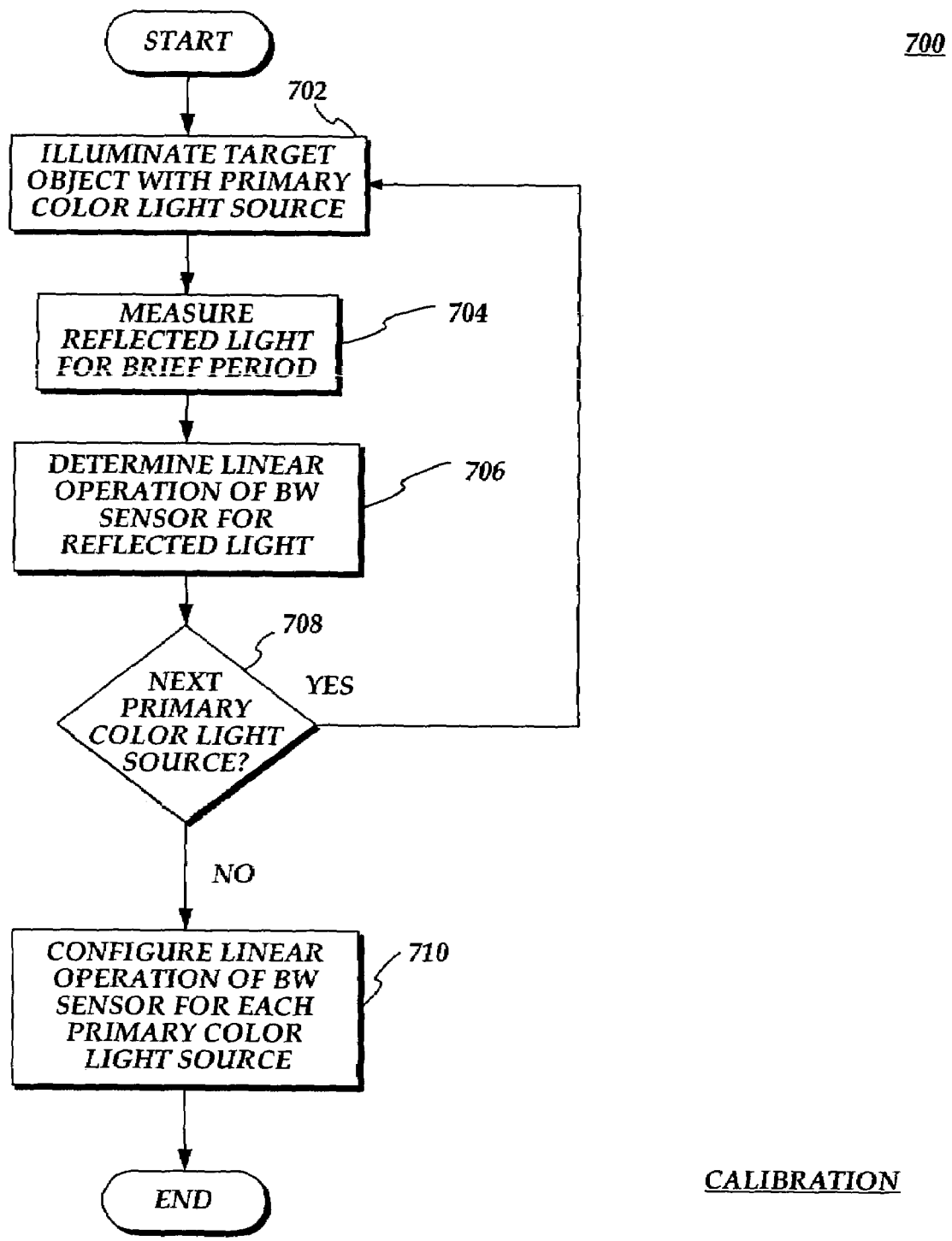
FIG. 7 illustrates a flowchart for calibrating a color machine vision system.

FIG. 7 illustrates an overview (700) of a flow chart for a process to calibrate the operation of a BW sensor measuring reflected colored light from multiple light sources. Moving from a start block, the process advances to block 702 where one of the light sources illuminates a target object with a colored light. At block 704, the process measures reflected colored light from the target object for a relatively brief period, but long enough to determine an amount of colored light that has been sensed and measured. Also, the brief period of time is selected so that the BW sensor won't have enough time to move from a linear mode of operation to a non-linear mode.

Next, the process advances to block 706 where a determination is made for a time period to measure the reflected colored light of the light source in the linear mode of operation for the BW sensor. This determination is based in part on the amount of colored light measured during the relatively brief period of time and a predetermined characteristic for moving from the linear mode to the non-linear mode of operation for the BW sensor.

At decision block 708, a determination is made as to whether the BW sensor has been calibrated for each of the differently colored lights from each of the light sources. If false, the process loops back to block 702 where substantially the same actions are performed in substantially the same way for the next colored light source.

Alternatively, if the determination at decision block 708 was true, the process would advance to block 710 where a linear mode of operation for the BW sensor is configured based on the determined time periods for measuring each of the colored light sources. Next, the process returns to performing other actions.

Figure 8:
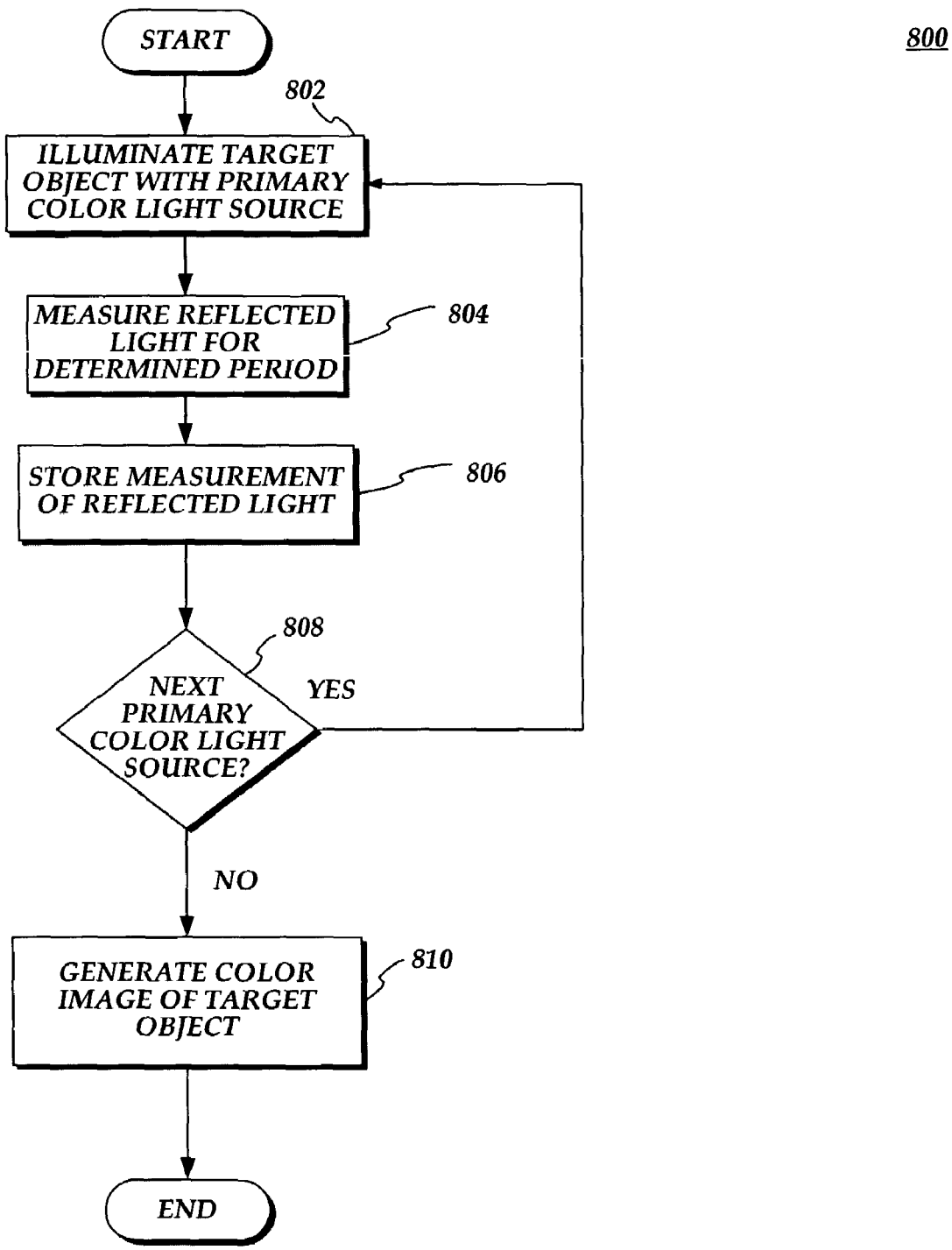
FIG. 8 shows a flowchart for operating a color machine vision system, in accordance with the present invention.

FIG. 8 illustrates an overview (800) of a flow chart for a process to enable a linear mode of operation for a BW sensor measuring reflected colored light from multiple light sources. Moving from a start block, the process advances to block 802 where one of the light sources illuminates a target object with colored light. At block 804, the process measures reflected colored light from the target object for a determined period of time previously calibrated for that particular light source. Also, although not shown, the BW sensor can measure for repeated determined periods of time to collect additional amounts of data regarding reflected colored light from a particular light source.

Next, the process advances to block 806 where the measurement(s) of the reflected colored light is stored for subsequent generation/rendering of a color image of the target object. The process flows to decision block 808, where another determination is made as to whether the BW sensor has measured reflected colored light for each of the light sources. If false, the process loops back to block 802, where substantially the same actions are performed in substantially the same way for the next colored light source.

However, if the determination at decision block 808 was true, the process would advance to block 810 where the color image of the surface of the target object would be generated based on the stored measurements of reflected colored light for each light source. Next, the process returns to performing other actions.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A color machine vision system, comprising:
a plurality of light sources arranged for separately illuminating a target object with differently colored light;
a black and white (BW) sensor configured for measuring primary colored light reflected from the target object, the BW sensor comprising a characteristic that enables a period of time to be determined for the BW sensor to linearly measure the amount of reflected colored light from each light source; and
a controller configured for enabling the BW sensor to separately measure the reflected primary colored light from each of the light sources in a linear mode of operation.

2. A color machine vision system, comprising:
a plurality of light sources arranged for separately illuminating a target object with differently colored light;
a black and white (BW) sensor configured for measuring primary colored light reflected from the target object; and
a controller configured for enabling the BW sensor to separately measure the reflected primary colored light from each of the light sources in a linear mode of operation, the controller further comprising enabling a calibration of each period of time that the BW sensor measures the reflected colored light from each of the plurality of light sources.

3. A controller, comprising:
a component configured to enable a plurality of light sources to separately illuminate a target object with differently colored light;
a component arranged for a black and white (BW) sensor to measure colored light reflected from the target object, the BW sensor comprising a characteristic that enables a period of time to be determined for the BW sensor to linearly measure the amount of reflected colored light from each light source; and
wherein the BW sensor is arranged to measure the reflected colored light in a linear mode of operation.

4. A controller, comprising:
a component configured to enable a plurality of light sources to separately illuminate a target object with differently colored light;
a component arranged for a black and white (BW) sensor to measure colored light reflected from the target object;
wherein the BW sensor is arranged to measure the reflected colored light in a linear mode of operation; and
a component for enabling a calibration of each period of time that the BW sensor measures the reflected colored light from each of the plurality of light sources.

5. A black and white (BW) sensor, comprising:
a component configured to receive reflected light from a target object, wherein the target object is illuminated with differently colored light by two light sources; and
a component arranged for measuring colored light reflected from the target object; wherein the BW sensor is arranged to measure the reflected colored light in a linear mode of operation the BW sensor comprising a characteristic that enables a period of time to be determined for the BW sensor to linearly measure the amount of reflected colored light from each light source.

6. A black and white (BW) sensor, comprising:
a component configured to receive reflected light from a target object, wherein the target object is illuminated with differently colored light by a plurality of light sources;
a component arranged for measuring colored light reflected from the target object; wherein the BW sensor is arranged to measure the reflected colored light in a linear mode of operation; and
a characteristic that enables a period of time to be determined for the BW sensor to linearly measure the amount of reflected colored light from each light source.

7. A black and white (BW) sensor, comprising:
a component configured to receive reflected light from a target object, wherein the target object is illuminated with differently colored light by a plurality of light sources;
a component arranged for measuring colored light reflected from the target object; wherein the BW sensor is arranged to measure the reflected colored light in a linear mode of operation; and
a component for enabling a calibration of each period of time that the BW sensor measures the reflected colored light from each of the plurality of light sources.

8. A method for color machine vision, comprising:
separately illuminating a target object with different colored light from a plurality of light sources;
measuring colored light reflected from the target object with a BW sensor;
enabling the BW sensor to separately measure the reflected colored light from each of the light sources, wherein the BW sensor is arranged to measure the reflected colored light in a linear mode of operation; and employing a characteristic of the BW sensor to determine a period of time for the BW sensor to linearly measure the amount of reflected colored light from each light source.

9. A method for color machine vision, comprising:
separately illuminating a target object with different colored light from a plurality of light sources;
measuring colored light reflected from the target object with a BW sensor;
enabling the BW sensor to separately measure the reflected colored light from each of the light sources, wherein the BW sensor is arranged to measure the reflected colored light in a linear mode of operation; and
calibrating each period of time that the BW sensor measures the reflected colored light from each of the plurality of light sources.

10. A machine vision system comprising:
a means for separately illuminating a target object with differently colored light from two light sources;
a means for measuring colored light reflected from the target object with a BW sensor; and
a means for enabling the BW sensor to separately measure the reflected colored light from each of the light sources, wherein the BW sensor is arranged to measure the reflected colored light in a linear mode of operation, wherein the BW sensor comprises a characteristic that enables a period of time to be determined for the BW sensor to linearly measure the amount of reflected colored light from each light source.

11. A color machine vision system, comprising:
two light sources arranged for separately illuminating a target object with two different colors of light;
a black and white (BW) sensor configured for measuring primary colored light reflected from the target object, the BW sensor comprising a characteristic that enables a period of time to be determined for the BW sensor to linearly measure the amount of reflected colored light from each light source; and
controller configured for enabling the BW sensor to separately measure the reflected primary colored light from each of the light sources in a linear mode of operation.

12. The system of claim 11, further comprising a data store for storing the measurements of the reflected colored light.

13. The system of claim 11, further comprising a display for displaying a color image based on at least the measurements of the reflected colored light.

14. The system of claim 11, wherein the plurality of light sources separately illuminate the target object with differently colored lights, wherein the differently colored lights include a red colored light, a green colored light, a blue colored light, a cyan colored light, a magenta colored light, a yellow colored light, and a composite colored light.

15. The system of claim 11, wherein the plurality of light sources separately illuminate the target object with at least one of infrared light and ultraviolet light.

16. The system of claim 11, wherein the BW sensor includes at least one of a photoelectric diode, capacitive coupled diode (CCD) element, and photo-resistive element.

17. The system of claim 11, wherein the controller further comprises a component for controlling a shutter that is disposed between each light source and the target object.

18. The system of claim 11, wherein the controller further comprises a component for controlling a shutter that is disposed between the BW sensor and the target object.

19. The system of claim 11, further comprising at least one filter that is disposed between each light source and the target object.

20. The system of claim 11, further comprising at least one filter that is disposed between the target object and the BW sensor.

21. The system of claim 11, wherein the controller further comprises a component for controlling intensity for each of the plurality of light sources.

22. The system of claim 11, wherein the controller further comprises a component for controlling a period of time that at least one of the plurality of light sources illuminates the target object.

23. The system of claim 22, wherein the component enables at least one of the plurality of light sources to strobe the target object after reflected light is initially detected by the BW sensor from the target object.

24. A controller, comprising:
a component configured to enable at least one of two light sources to separately illuminate a target object with differently colored light;
a component arranged for a black and white (BW) sensor to measure colored light reflected from the target object the BW sensor comprising a characteristic that enables a period of time to be determined for the BW sensor to linearly measure the amount of reflected colored light from each light source; and
wherein the BW sensor is arranged to measure the reflected colored light in a linear mode of operation.

25. The controller of claim 24, further comprising a data store for storing the measurements of the reflected colored light.

26. The controller of claim 24, further comprising a component for enabling the display of a color image based on at least the measurements of the reflected colored light.

27. The controller of claim 24, further comprising a component for controlling at least an intensity of colored light illuminated onto the target object by at least one of the plurality of light sources.

28. The controller of claim 24, further comprising a component for controlling a shutter that is disposed between each light source and the target object.

29. The controller of claim 24, further comprising a component for controlling a shutter that is disposed between the BW sensor and the target object.

30. The controller of claim 24, further comprising a component for controlling intensity for each of the plurality of light sources.

31. The controller of claim 24, further comprising a component for controlling a period of time that at least one of the plurality of light sources illuminates the target object.

32. The controller of claim 31, wherein the component enables at least one of the plurality of light sources to strobe the target object after reflected light is initially detected by the BW sensor from the target object.

33. A method for color machine vision, comprising:
separately illuminating a target object with different colored light from two light sources;
measuring colored light reflected from the target object with a BW sensor wherein the BW sensor comprises a characteristic that enables a period of time to be determined for the BW sensor to linearly measure the amount of reflected colored light from each light source; and
enabling the BW sensor to separately measure the reflected colored light from each of the light sources, wherein the BW sensor is arranged to measure the reflected colored light in a linear mode of operation.

34. The method of claim 33, further comprising enabling the display of a color image based on at least the measurements of the reflected colored light.

35. The method of claim 33, further comprising controlling a shutter that is disposed between each light source and the target object.

36. The method of claim 33, further comprising controlling a shutter that is disposed between the BW sensor and the target object.

37. The method of claim 33, further comprising controlling intensity for each of the plurality of light sources.

38. The method of claim 33, further comprising controlling a period of time that at least one of the plurality of light sources illuminates the target object.

* * * * *